US005774132A

United States Patent [19]

Uchiyama

[11] Patent Number: 5,774,132

[45] Date of Patent: Jun. 30, 1998

[54] VIDEO CAPTURE COMPUTER SYSTEM USING LOCAL MEMORY FOR TEXTURE MAPPING

[75] Inventor: Toshimi Uchiyama, Hamamatsu, Japan

[73] Assignee: Yamaha Corporation, Hamamatsu, Japan

[21] Appl. No.: 547,719

[22] Filed: Oct. 26, 1995

[30] Foreign Application Priority Data

Oct. 28, 1994 [JP] Japan .................................... 6-289065

[51] Int. Cl.$^{6}$ ...................................................... G06F 15/16

[52] U.S. Cl. .......................... 345/503; 345/507; 345/509; 345/512; 345/430; 345/425

[58] Field of Search .................................... 395/501, 503, 395/507, 509, 511, 515, 520, 522, 523, 525, 526, 118, 119, 120, 125, 129, 130, 135–139; 345/115, 118, 126, 127, 186, 189, 191, 203, 501, 503, 507, 509, 511, 515, 520, 522, 523, 526, 418–420, 425, 429, 430, 512

[56] References Cited

U.S. PATENT DOCUMENTS

| | | | |
|---|---|---|---|
| 4,970,666 | 11/1990 | Welsh et al. | 395/123 |
| 5,335,321 | 8/1994 | Harney et al. | 395/503 |
| 5,432,900 | 7/1995 | Rhodes et al. | 395/118 |
| 5,511,153 | 4/1996 | Azaebayejani et al. | 395/119 |

*Primary Examiner*—Matthew M. Kim
*Assistant Examiner*—U. Chauhan
*Attorney, Agent, or Firm*—Pillsbury Madison & Sutro LLP

[57] ABSTRACT

A graphic apparatus is connected between a host computer and a monitor for admitting video data from a video source to display a picture on the monitor according to commands from the host computer. The graphic apparatus is constructed by a local memory, an admitting unit, a driver unit and a drawing tool. The local memory is provided separately from the host computer, and is functionally divided into a video memory area for storing video data including those representing a graphic pattern and a frame memory area for storing video data representing a picture to be displayed. The admitting unit operates in response to an admission command from the host computer for admitting video data from the video source and reserving the admitted video data in the video memory area. The driver unit operates in response to a drive command from the host computer for transferring the video data from the frame memory area to the monitor so as to display the picture. The drawing tool responds to a drawing command from the host computer for setting a first region within the video memory area to cut out a desired graphic pattern, for setting a second region within the frame memory area to define a desired space in the picture, and for transferring the video data from the first region to the second region to fill the space of the picture by the graphic pattern.

6 Claims, 4 Drawing Sheets

VIDEO CAPTURE COMPUTER SYSTEM USING LOCAL MEMORY FOR TEXTURE MAPPING

BACKGROUND OF THE INVENTION

The present invention relates to a graphic apparatus for display video data on a monitor of a computer system.

Recent developments of the graphic computer system creates a video capture computer system which can display video data on a monitor. In such a system, a host computer captures video data by means of a video capture apparatus, and feed the captured video data to a graphic apparatus for displaying a picture. When change in size or other attributes of the picture is required, the host computer carries out pixel computation according to commands to effect geometrical transformation of the picture.

The above mentioned conventional system is provided with a main video memory for storing a great volume of video data and a separate frame memory or frame buffer which is directly connected to the monitor for temporarily storing video data transferred from the main video memory of the host computer. Therefore, data traffic considerably increases in a system bus, thereby hindering performance of the system. Further, the host computer must carry out the pixel computation in order to freely change size or other factors of the picture. Such as additional task may create delay of display operation, resulting in unnatural representation of a motion picture, and may disadvantageously suppress operation speeds of other application programs which are running in parallel.

SUMMARY OF THE INVENTION

In view of the above noted drawbacks of the prior art, an object of the present invention is to provide a graphic apparatus which can process video data to display a picture in flexible forms at a high speed without affecting data traffic of a system bus and without imposing additional tasks on a host computer.

According to the invention, a graphic apparatus is connected between a host computer and a monitor for admitting video data from a video source to display a picture on the monitor according to commands from the host computer. The graphic apparatus comprises local memory means, provided separately from the host computer, which is functionally divided into a video memory area for storing video data including those representing a graphic pattern and a frame memory area for storing video data representing a picture to be displayed, admitting means operative in response to an admission command from the host computer for admitting video data from the video source and reserving the admitting video data in the video memory area, driver means operative in response to a drive command from the host computer for transferring the video data from the frame memory area to the monitor so as to display the picture, and drawing means responsive to a drawing command from the host computer and including first means for setting a first region within the video memory area to cut out a desired graphic pattern, second means for setting a second region within the frame memory area to define a desired space in the picture, and third means for transferring the video data from the first region to the second region to fill the space of the picture by the graphic pattern.

Further, according to the invention, a video capture system comprises a host computer for creating commands, a video source for supplying video data, local memory means, provided separately from the host computer, which is functionally divided into a video memory area for reserving video data and a frame memory area for storing processed video data representing a picture to be displayed, and a monitor connected to the local memory means for displaying the picture according to the processed video data. The system further comprises graphic means connected to the host computer through a host bus to receive therefrom admission, drawing, and drive commands and being connected to the local memory means through a local bus which is separate from the host bus. The graphic means comprises admitting means responsive to the admission command for admitting the video data from the video source and for transferring the admitted video data to the video memory area through the local bus, drawing means responsive to the drawing command for processing the video data reserved in the video memory area and for transferring the processed video data from the video memory area to the frame memory area, and driver means responsive to the drive command for feeding the processed data to the monitor to thereby enable the same to display the picture.

The inventive video capture computer system utilizes the local memory which works as both of a video memory and a frame memory. Therefore, the video data is admitted and transferred to the localized video memory through the local bus according to the command from the host computer without using the host bus. Such a construction does not affect data traffic of the system bus. Further, the graphic apparatus or graphic controller is equipped with the drawing means or drawing tool such as a texture mapping tool. The tool is operated to set the first region or pattern region within the video memory area of the local memory to cut out a desired texture, and to set the second region or fill region within the frame memory area of the local memory to define a desired space in the picture. Then, the video data are transferred from the pattern region to the fill region to allocate the cut texture to the space to thereby carry out the texture mapping. Therefore, the desired texture pattern represented by the admitted video data can be applied to the displayed picture in geometrically transformed form by contraction, expansion, translation, rotation and affine conversion without imposing heavy tasks on the host computer. Further, such a geometrical transformation is conducted by the drawing tool integrated within the graphic controller at high operation speed without affecting other operation speeds. Moreover, the texture mapping can be conducted on a segment by segment basis with the fill region to realize allocation of the texture to a virtually curved space of the picture.

DETAILED DESCRIPTION OF THE INVENTION

Figure 1:
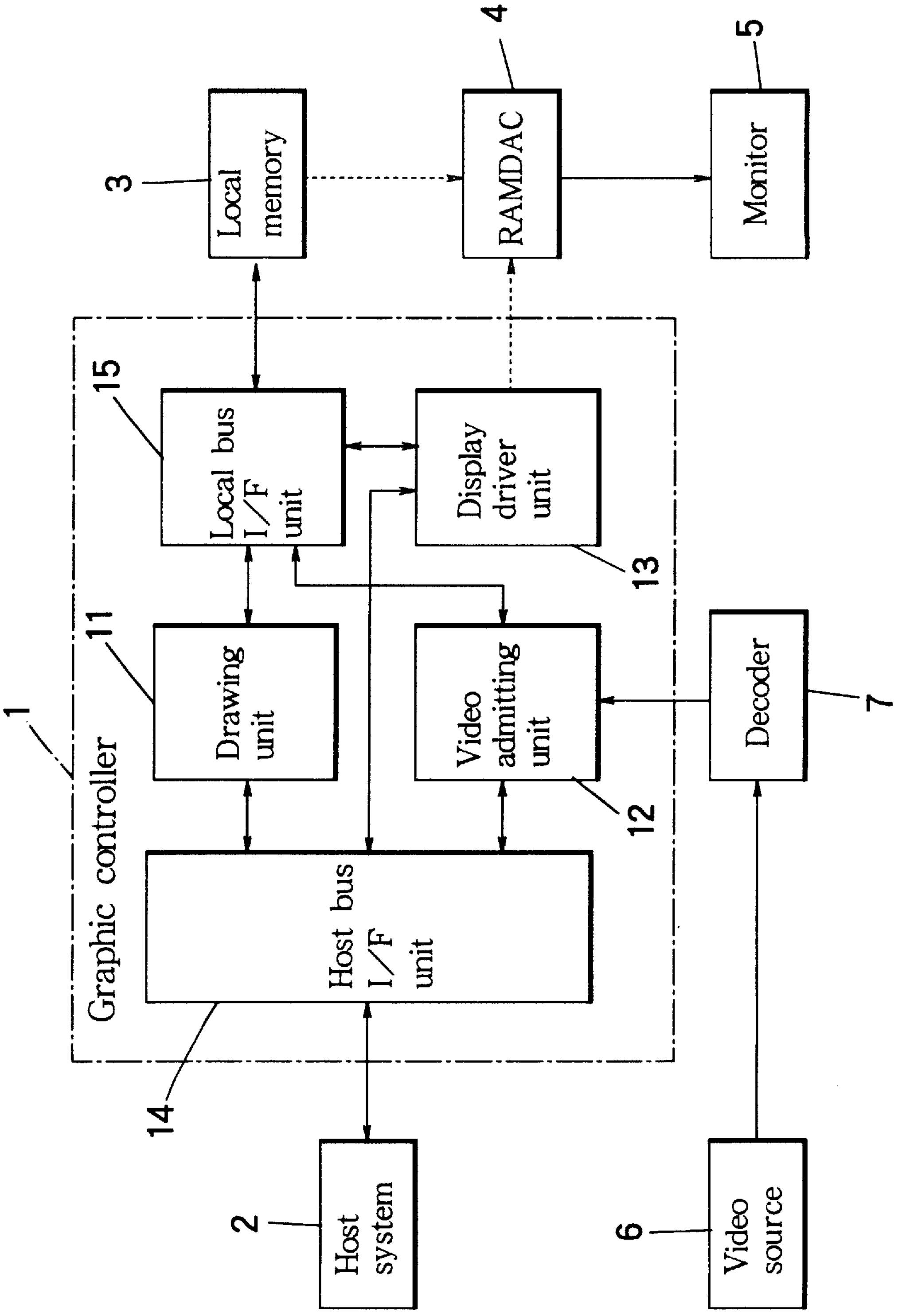
FIG. 1 is a block diagram showing the inventive video capture computer system including an embodiment of a graphic controller.

Hereinafter, embodiments of the invention will be described in conjunction with the drawings. FIG. 1 shows a block construction of one embodiment of the inventive graphic apparatus. The apparatus includes a graphic controller 1 which carries out display control of video data and which is connected to a host system 2 such as a host computer through a host bus. A local memory 3 is connected to the graphic controller 1 and works as a video memory and a frame memory. Further, the local memory 3 functions as a texture memory for use in texture mapping. The graphic controller 1 controls reading and writing operations of the local memory 3. The graphic controller 1 is composed of a one chip LSI (Large Scale Integrated circuit).

The local memory 3 stores video data, which are processed by the graphic controller 1 and are then fed to a monitor 5 such as CRT. A RAMDAC (Random Access Memory Digital Analog Converter) 4 is interposed between the local memory 3 and the monitor 5. The video data are supplied from a video source 6 such as video camera and video disc and are admitted by the graphic controller 1 through a decoder 7. The RAMDAC 4 is a data converter for displaying a picture on the monitor 5 according to the video data. The RAMDAC 4 is a combination of a color decoding RAM and a D/A converter for reproducing the video data in analog form.

The graphic controller 1 is composed of a drawing unit 11, a video admitting unit 12, a display driver unit 13 and so on. These units are connected to the host system 2 through a host bus interface (I/F) unit 14. The drawing unit 11 operates in response to a drawing command from the host system 2 for processing the video data and transferring the same to and from the local memory 3. The drawing unit 11 is connected to the local memory 3 through a local bus I/F unit 15. The video admitting unit 12 operates according to an admission command from the host system 2 for admitting the video data and transmitting the admitted video data to the local memory 3 through the local bus I/F unit 15. The display driver unit 13 operates based on a drive command from the host system 2 for retrieving the video data stored in the local memory 3 so as to display a picture on the monitor 5 according to the retrieved video data.

Figure 2:
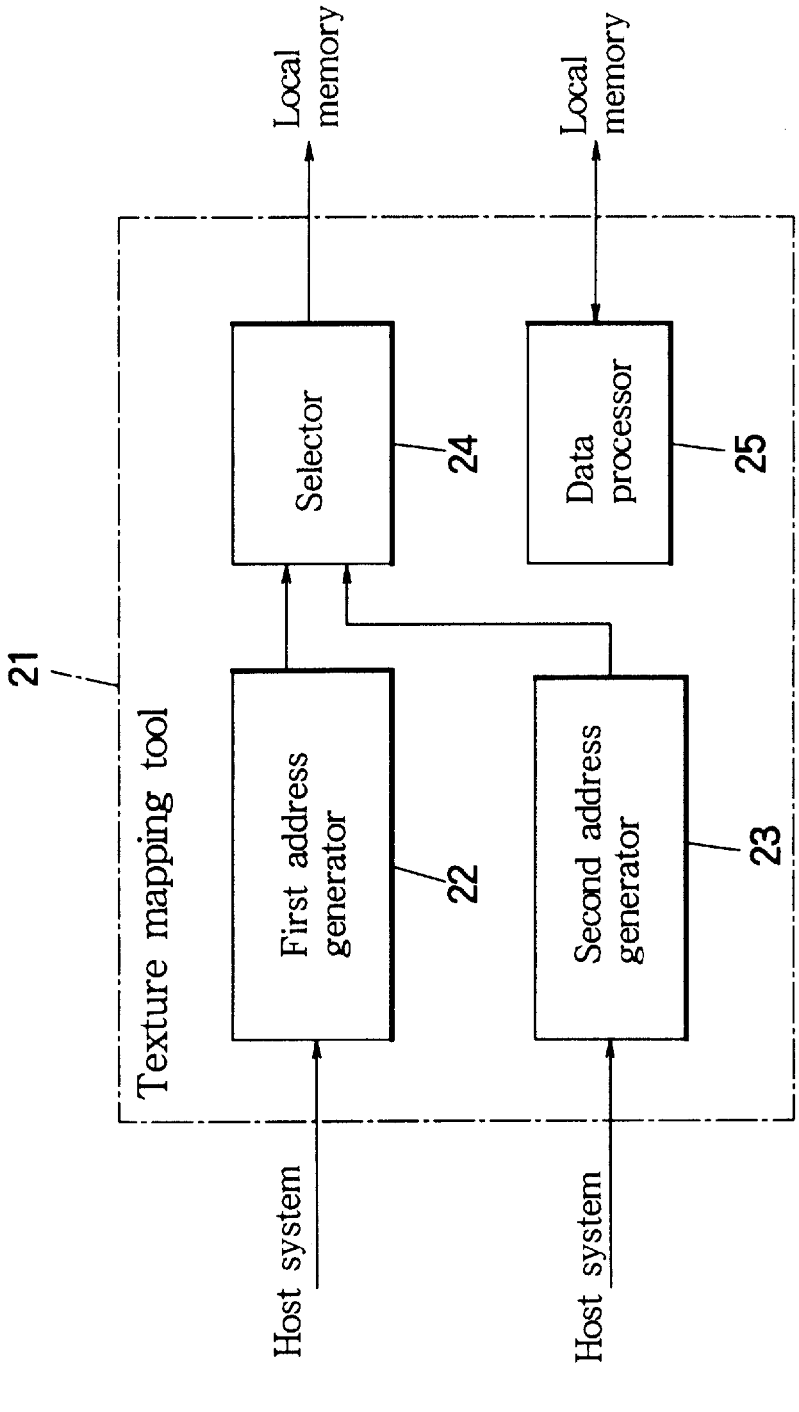
FIG. 2 is a block diagram showing a texture mapping tool provided in the graphic controller.

The drawing unit 11 contains a texture mapping tool 21 as shown in a simplified functional block diagram of FIG. 2. In the figure, the texture mapping tool 21 is comprised of address generators 22 and 23, a selector 24 and a data processor 25. The first address generator 22 operates according to commands from the host system 2 for generating texture read addresses effective to determine a first region of a graphic texture pattern. The second address generator 23 operates also according to commands from the host system 2 for generating fill or write addresses effective to specify a second region of a desired space in a picture, to which is applied the texture pattern cut out from the first region. Thus, the first region of the texture pattern and the second region of the picture space correspond to each other for texture mapping. The selector 24 selectively feeds either of the read addresses and the write addresses to the local memory 3. The data processor 25 sequentially executes reading and writing of the video data in the local memory 3 so as to carry out the texture mapping.

Next, description is given for operation of the graphic apparatus constructed as described above. Initially, the host system 2 transmits to the video admitting unit 12 a setting command effective to set a video memory area in the local memory 3 into which video data are written. Then, the host system 2 permits the video admitting unit 12 to admit the video data. Consequently, the video data are inputted from the external video source 6 into the video admitting unit 12 through the decoder 7. The admitted video data are written into the video memory area set in the local memory 3 through the local I/F unit 15.

The host system 2 issues to the display driver unit 13 a drive command effective to specify a frame of the video data to be displayed and stored in the local memory 3. Then, the host system 2 permits the display driver unit 13 to read out the specified frame of the video data from a frame memory area provided in the local memory 3, and to feed the read video data to the monitor 5 for display. The local memory 3 may be composed of a dual port VRAM so that the video data are transferred directly by means of the RAMDAC 4 to the monitor 5 from the local memory 3. Otherwise, the local memory 3 may be composed of a DRAM so that the video data read out from the local memory 3 are fed to the monitor 5 through the local bus I/F unit 15, the display driver unit 13 and the RAMDAC 4.

When the host system 2 occasionally requests back the video data once inputted into the graphic apparatus, the video data are transferred from the local memory 3 to the host system 2 through a reverse route of the local bus I/F unit 15, the video admitting unit 12 and the host bus I/F unit 14. In such a case, the video admitting unit 12 passes a signal necessary for reading of the admitted video data to the host system 2 through the host bus I/F unit 14.

Figure 3:
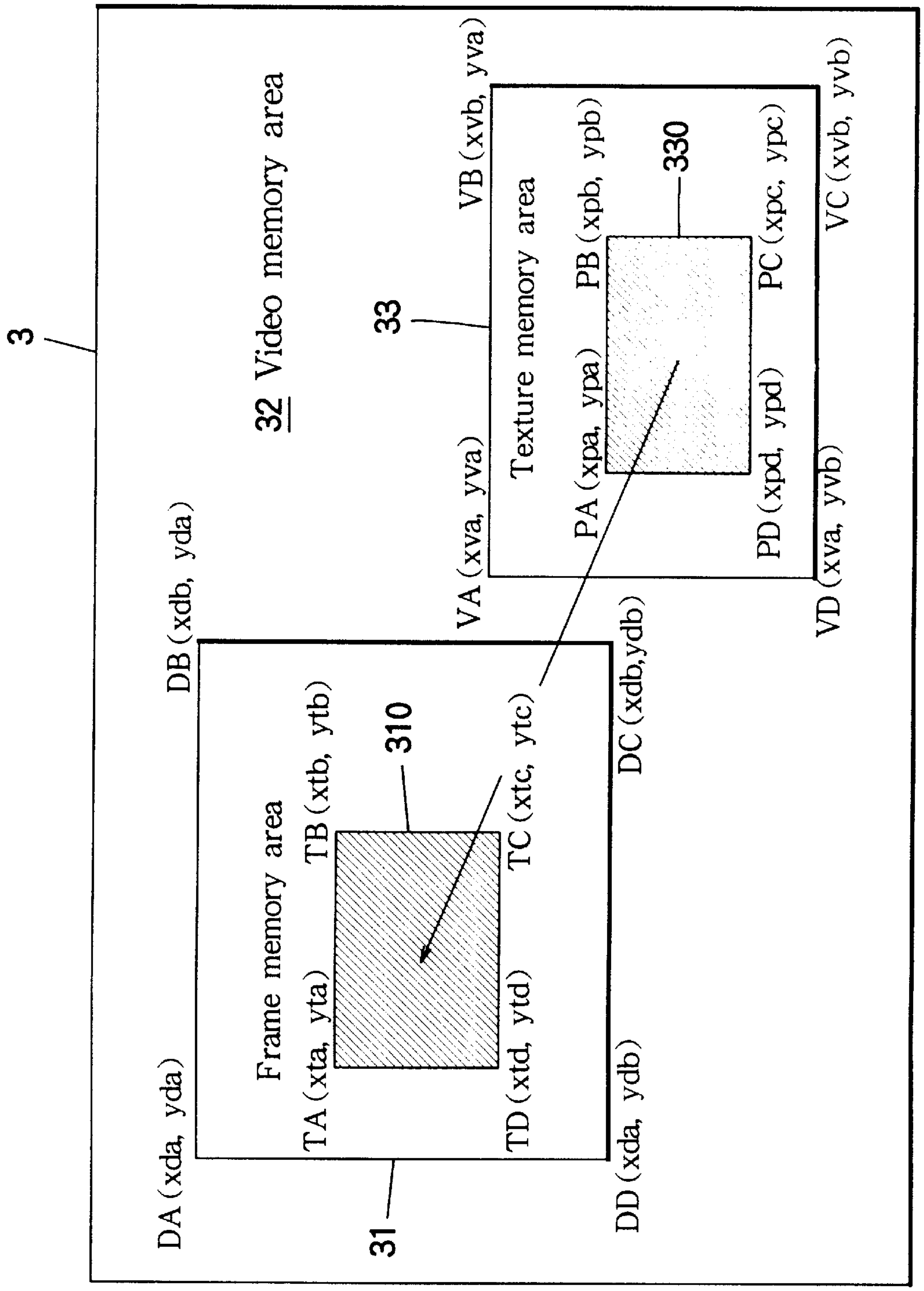
FIG. 3 is a schematic digram showing the structure of a local memory provided in the inventive system.

Occasionally, when the host system 2 commands drawing of a figure into a picture displayed on the monitor, a drawing command is issued from the host system 2 to the drawing unit 11 through the host bus I/F unit 14. The drawing unit 11 executes the drawing command so that the video data admitted by the video admitting unit 12 are selectively written into the local memory 3. As shown in FIG. 3, the local memory 3 is functionally divided into the frame memory area 31 which is defined in terms of memory plane coordinate DA(xda,yda) DB(xdb,yda), DC(xdb,ydb) and DD(xda,ydb) so as to store one frame of the video data to be displayed as a picture, and the video memory area 32 provided outside the frame memory area 31 for reserving the admitted video data. Further, the local memory 3 is set with a texture memory area 33 as a part of the video memory area 32 for storing particular video data representative of a texture pattern to be displayed. The texture memory area 33 is defined in terms of memory plane coordinate VA(xva, yva), VB(xvb,yva), VC(xvb,yvb) and VD(xva,yvb). A desired first region 330 is specified within the texture memory area 33 in terms of the coordinates PA(xpa,ypa), PB(xpb,ypb), PC(xpc,ypc) and PD(xpd,ypd). Further, a desired second region 310 is specified within the frame memory area 31 in terms of coordinates TA(xta,yta), TB(xtb, ytb), TC(xtc,ytc) and TD(xtd,ytd) such that a picture space defined by the second region 310 is filled with or mapped by the texture pattern cut out from the first region 330. Namely, the drawing unit 11 operates based on the drawing or mapping command from the host system 2 for specifying or designating the texture pattern and the picture space. In detail, the texture mapping tool 21 shown in FIG. 2 is operated such that the first address generator 22 generates texture read addresses according to the coordinates PA–PD within the desired first region 330 while the second address generator 23 generates write addresses according to the coordinates TA–TD within the desired second region 310 of the picture space. Further, the tool 21 is operated to execute the texture mapping by transfer of video data from the first region 330 to the second region 310 according to the generated read and write addresses. The data processor 25 sequentially reads out the video data from the first region 330 within the texture memory area 33 set as a part of the video memory are 32 according to the read address. The data processor 25 further writes the read video data into the second region 310 within the frame memory area 31 of the same local memory 3 according to the write addresses. Then, the video data written into the frame memory area 31 are sequentially read out and transferred to the monitor 5 by the display driver unit 13 so that the texture pattern cut out from the first region 330 is fitted into the space of the picture displayed on the monitor 5.

Figures 4A, 4B, 4C, 4D, 4E, 4F:
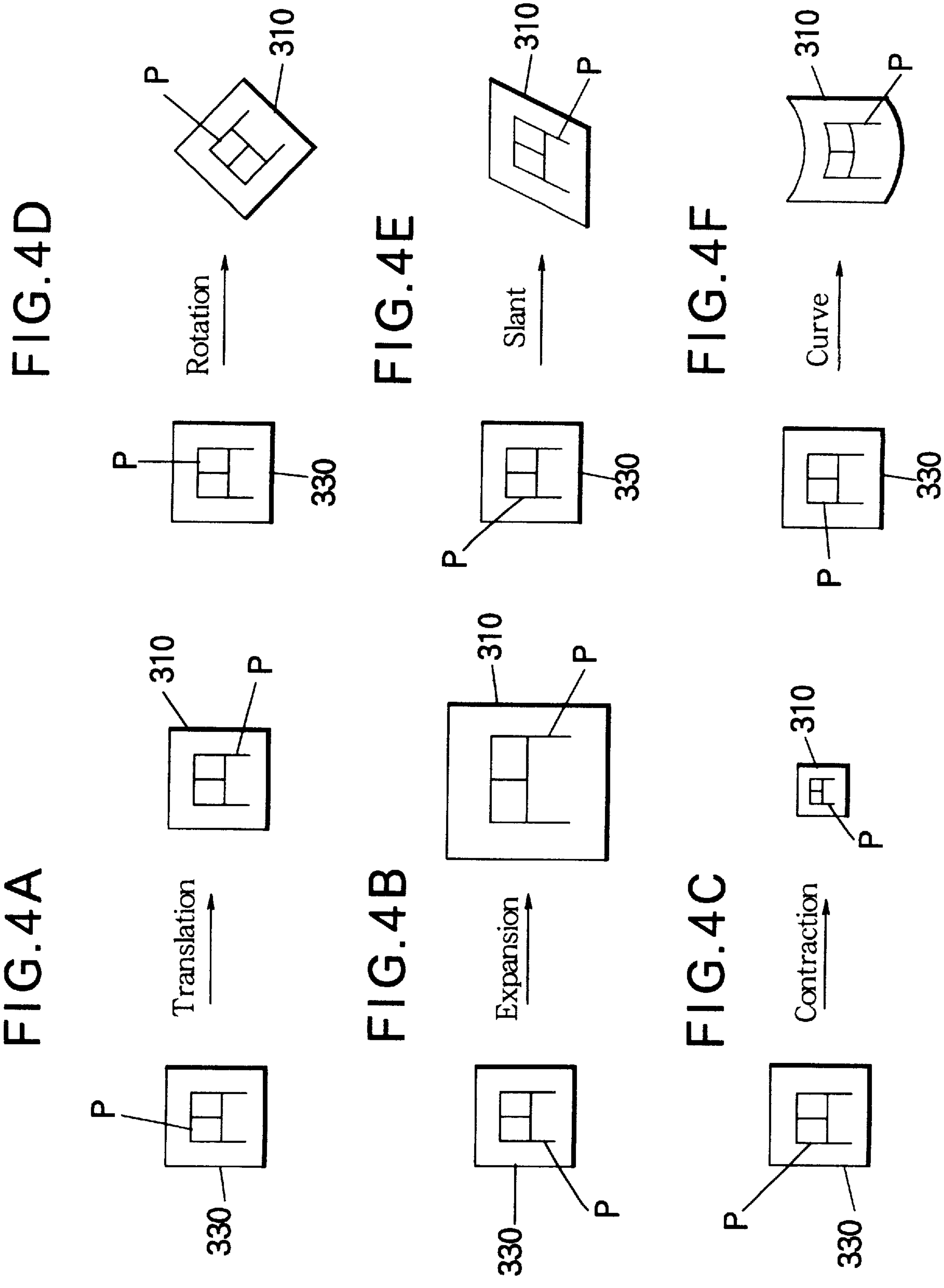
FIGS. 4A–4F show various modes of the texture mapping.

The texture mapping can be performed in various manners by geometrical transformation according to designation of the first region and the second region. For example, FIG. 4A shows one-to-one or translation mapping where a texture pattern P cut out from the first region 330 is fitted as it is into the corresponding second region 310 of the picture space having a shape identical to that of the first region 330. FIG. 4B shows expansion mapping where the texture pattern P is applied in an enlarged form to the picture space having a size greater than the initial cut size of the pattern. In contrast, FIG. 4C illustrates contraction mapping where the texture pattern P is applied in a reduced form to the space of the picture. FIG. 4D illustrates rotation mapping where the texture pattern P is applied to the picture space in a rotated form. FIG. 4E shows slant mapping where the texture pattern P is applied in a slant form. These mapping modes are freely combined with each other to realize the allocation of the texture pattern to more complicated space of the picture. Further, FIG. 4F illustrates mapping of the plain texture pattern P on a virtually curved space of the picture. In this case, the texture first region and the frame second region are divided into tiny segments, respectively. Then, the texture mapping is successively carried out a segment by segment basis.

In the present embodiment, the graphic controller 1 performs not only the above described texture mapping but also image capturing. In the image capturing, an image represented by video data obtained by a video camera or the like is graphically captured or integrated into a space of a figure or drawn picture represented by the drawing data fed from the host system 2. The image capturing is carried out as follows. First, the drawing data from the host system 2 are written into the frame memory area of the local memory 3 through the host bus I/F unit 14, the drawing unit 11 and the local bus I/F unit 15. At this moment, the drawing unit 11 carries out adequate data conversion and address conversion. On the other hand, the video admitting unit 12 admits through the decoder 7 the video data which are integrated into the drawing data fed from the host system 2. The video admitting unit 12 carries out necessary address computation such that the admitted video data are also written into the local memory 3 through the local bus I/F unit 15. At this moment, the address computation is suitably conducted by the video admitting unit 12 so that the admitted video data are written into a desired region set within the frame memory area.

By such a manner, composite video data are formed where the initial video data are integrated into the drawing data by the image capturing. The display driver unit 13 reads out the composite image data from the frame memory area of the local memory 3, and transfers the read data to the monitor 5 to thereby display the picture which captures therein an image represented by the video data. In detail, the display driver unit 13 generates a sync signal according to a master timing signal fed from the host system 2, and provides the sync signal to the RAMDAC 4 and the monitor 5. Further, the display driver unit 13 sends a screen refresh cycle request to the local bus I/F unit 15 so as to enable the local memory 3 to supply the composite video data a frame by frame along with the sync signal in case that the local memory 3 is composed of DRAM. Alternatively, the display driver unit 13 sends a read transfer cycle request in place of the screen refresh cycle request provided that the local memory 3 is composed of VRAM.

In the above capturing operation, the three of the drawing unit 11, the video admitting unit 12 and the local bus I/F unit 15 operate independently from each other in parallel manner. Namely, the drawing unit 11 processes the drawing data fed from the host system 2, the video admitting unit 12 processes the video data fed from the external video source 6, and the local bus I/F unit 15 processes the composite video data or picture data stored in the frame memory area of the local memory 3 in parallel manner. Therefore, the drawing operation would not be interrupted by the admitting operation of the video data, and vice versa.

Further in this embodiment, a Z buffer memory area can be set together with the texture memory area in the local memory without overlapping the frame memory area so as to realize three-dimensional graphics. The Z buffer memory has addresses in a depth direction, i.e., Z direction. The host system 2 commands the drawing unit 11 to designate the Z buffer memory area in the local memory 3. The drawing unit 11 generates depth data which are stored in the Z buffer memory area of the local memory 3. Each of the depth data determines a depth position of a corresponding pixel in the Z direction. The use of the Z buffer memory realizes the texture mapping and image capturing in the three-dimensional graphics which treats a three-dimensional object.

The present invention is not limited to the disclosed embodiment. For example, RAMDAC 4 may be integrated in to the display driver unit 13 of the graphic controller 1 if the local memory 3 is composed of DRAM. Further, the decoder 7 may be integrated into the video admitting unit 12. The invention cover various modifications without departing from an essence of the invention.

As described above, in the graphic apparatus according to the invention, the local memory functions as a video memory as well as a regular frame memory. Therefore, the video data can be transferred to the local memory through the local bus rather than the system bus without affecting or disturbing data traffic of the system bus. Further, the graphic controller has a texture mapping tool for displaying a picture mapped with a desired texture pattern without imposing additional tasks on the host system. The texture mapping can be conducted in diverse manners including geometrical expansion, contraction and rotation without substantial reduction in operation speed to thereby enable fast graphic operation.

What is claimed is:

1. A graphic apparatus connected between a host computer and a monitor for admitting video data from a video source to display a picture on the monitor according to commands from the host computer, the graphic apparatus comprising:

local memory means provided separately from the host computer, and being functionally divided into a video memory area for storing video data including those representing a graphic pattern and a frame memory area for storing video data representing a picture to be displayed;

admitting means operative in response to an admission command from the host computer for admitting video data from the video source and reserving the admitted video data in the video memory area;

driver means operative in response to a drive command from the host computer for transferring the video data from the frame memory area to the monitor so as to display the picture; and drawing means responsive to a drawing command from the host computer and including first means for setting a first region within the video memory area to cut out a desired graphic pattern representing a desired texture pattern, second means for setting a second region within the frame memory area to define a desired space in the picture, and third means for transferring the video data from the first region to the second region to map the desired texture pattern to the desired space in the picture.

2. A graphic apparatus according to claim 1 wherein the third means comprises means for transferring the video data from the first region to the second region such that the graphic pattern representing the desired texture pattern to geometrically transformed to fit into the space of the picture.

3. A graphic apparatus according to claim 1; wherein the first means comprises means for generating read addresses to specify the first region, the second means comprises means for generating write addresses to specify the second region, and the third means comprises means for transferring the video data from the first region to the second region according to the generated read and write addresses.

4. A video capture system comprising:

a host computer for creating command;

a video source for supplying video data;

local memory means provided separately from the host computer, and being functionally divided into a video memory area for reserving video data and a frame memory area for storing processed video data representing a picture to be displayed;

a monitor connected to the local memory means for displaying the picture according to the processed video; and graphic means connected to the host computer through a host bus to receive therefrom admission, drawing, and drive commands and being connected to the local memory means through a local bus which is separate from the host bus, the graphic means comprising admitting means responsive to the admission command for admitting the video data from the video source and for transferring the admitted video data to the video memory area through the local bus, drawing means responsive to the drawing command for processing the video data reserved in the video memory area to represent a desired texture pattern and for transferring the processed video data from the video memory area to the frame memory area, and driver means responsive to the drive command for feeding the processed video data to the monitor to map the desired texture pattern to a desired space in the picture.

5. A method of operating a graphic apparatus connected between a host computer and a monitor for admitting video data from a video source to display a picture on the monitor according to commands from the host computer, the method comprising the step of:

preparing local memory means which is provided separately from the host computer and which is functionally divided into a video memory area and a frame memory area;

storing video data including those representing a texture pattern in the video memory area;

storing video data representing a picture to be displayed in the frame memory area;

admitting video data from the video source in response to an admission command from the host computer and reserving the admitted video data in the video memory area;

transferring the video data from the frame memory area to the monitor in response to a drive command from the host computer so as to display the picture;

setting a first region within the video memory area in response to a drawing command from the host computer to cut out a desired texture pattern;

setting a second region within the first memory area to define a desired space in the picture; and transferring the video data from the first region to the second region to map the texture pattern to the desired space in the picture.

6. A method of operating a video capture system composed of a host computer for creating commands, a video source for supplying video data, local memory means provided separately from the host computer and being functionally divided into a video memory area for reserving video data and a frame memory area for storing processed video data representing a picture to be display, a monitor connected to the local memory means for displaying the picture according to the processed video data, and graphic means connected to the host computer through a host bus to receive therefrom admission, drawing, and drive commands and being connected to the local memory means through a local bus which is separate from the host bus, the method comprising the steps of:

admitting the video data in the graphic means from the video source in response to the admission command;

transferring the admitted video data to the video memory area through the local bus;

processing the video data reserved in the video memory area to represent a desired texture pattern in response to the drawing command;

transferring the processed video data from the video memory area to the frame memory area; and feeding the processed data to the monitor in response to the drive command to map the desired texture pattern to a desired space in the picture.

* * * * *